Aug. 23, 1932.                H. C. FRENTZEL, JR                1,873,379
                       ENGINE HEATING AND COOLING SYSTEM
                              Filed June 5, 1929
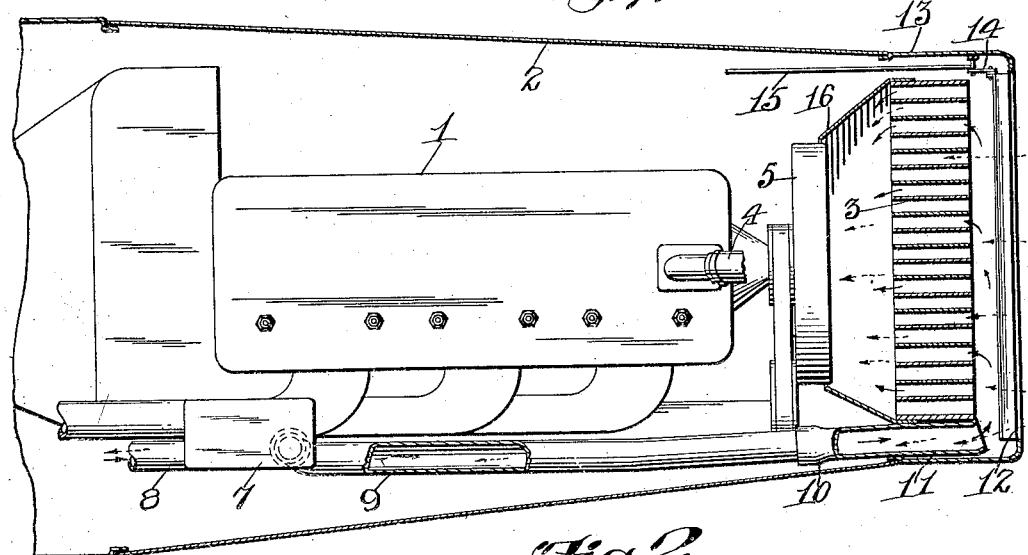
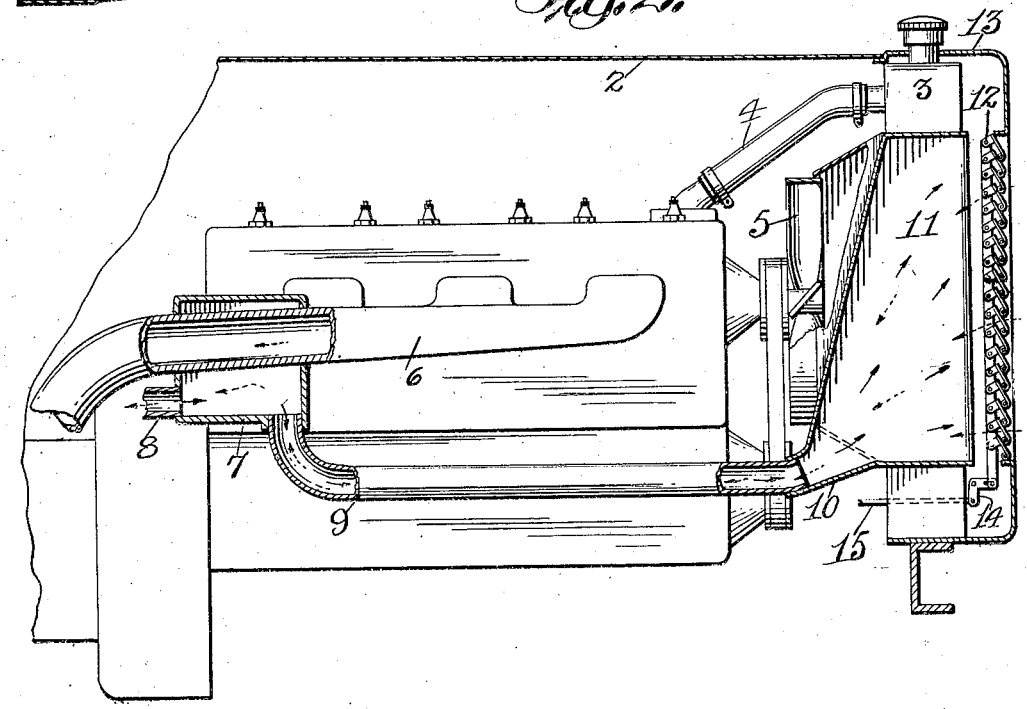
Inventor
Herman C. Frentzel, Jr.
By Young and Young
Attorneys Patented Aug. 23, 1932

1,873,379

UNITED STATES PATENT OFFICE

HERMAN C. FRENTZEL, JR., OF MILWAUKEE, WISCONSIN

ENGINE HEATING AND COOLING SYSTEM

Application filed June 5, 1929. Serial No. 368,584.

This invention relates to improvements in heating systems for motor vehicles.

One of the objects of my invention is the provision of a novel device whereby air is introduced into a suitable receiver and conveyor passing through a heating chamber surrounding the exhaust pipe of the motor and from this chamber it is conveyed back to the interior of the motor vehicle, thus utilizing the heat radiating from the exhaust manifold for heating the air previous to its entrance to the vehicle.

Another object of my invention is the provision of an auxiliary hood or covering adapted to be positioned over the ordinary type of radiator for motor vehicles and provided with a regulator for regulating the supply of air introduced beneath the hood of the vehicle and also to provide a receiver arranged adjacent the radiator for receiving a part of the air to be conducted rearwardly to the heating chamber around the exhaust pipe, thence to the interior of the vehicle.

A further object of the invention is the provision of a heating device including a hood adapted to be arranged over a radiator of a motor vehicle and provided with shutters for controlling the entrance of air to the radiator together with means for conducting a portion of the air rearwardly to the vehicle whereby when the shutters are closed the air in the conductor to the vehicle will be drawn forwardly by means of the usual cooling fan and circulated around the engine of the vehicle and as the air drawn forward is passed through a heating chamber surrounding the exhaust, the air will be in a heated condition and have a tendency to warm the air around the motor and radiator to assist in warming up the motor after it has been started.

With the above and other objects in view, the invention consists in the novel features of construction, the combination and arrangement of parts hereinafter more fully set forth, pointed out in the claim and shown in the accompanying drawing wherein:

Figure 1 is a top plan view with parts thereof broken away and illustrated in cross section; and Figure 2 is a side elevation with parts thereof broken away and illustrated in cross section.

Referring more particularly to the drawing, the numeral 1 indicates a motor enclosed within the usual type of hood 2, and at the front of the motor is a radiator 3 connected to the water jacket of the motor by the conduit 4 and arranged in front of the motor is the usual cooling fan 5. An exhaust manifold 6 at one side of the motor leads rearwardly to a suitable exit and surrounding the exhaust pipe or manifold is a heating chamber 7.

Leading from the chamber 7 rearwardly to the interior of the vehicle body, not shown, is a conducting pipe 8 which conveys the heated air to the interior of the vehicle. Leading forwardly from the chamber 7 is a conductor 9 which is connected to the lower reduced end 10 of a receiving chamber 11. This receiving chamber is somewhat elongated in form and is arranged at one side of the radiator 3 with its open side at the front of the radiator to receive fresh air through the shutter 12.

The shutter 12 is carried by an auxiliary hood 13 which is fitted over the radiator 3 to enclose the front portion thereof, as shown in the drawing. The auxiliary hood 13 may be retained in position in any suitable manner and the shutter 12 is connected to a bell crank 14 operated by means of a rod 15 which is accessible to the driver so that the shutter 12 may be opened and closed when desired.

In operation, the shutter 12 is preferably closed when the motor is first started so that the suction from the fan 5 will create a suction back through the conductors 8 and 9, drawing air forwardly from the heating chamber 7 and discharge it from the mouth of the chamber 11, and as the shutter 12 is closed the heated air thus taken from the chamber 11 will circulate around beneath the hood 2 and have a tendency to heat the motor and radiator during its preliminary starting operation. However, when the shutter 12 is opened, the cool air will pass into the chamber 11, as well as through the radiator 3, and be conducted rearwardly around the exhaust and become heated to pass into the conductor 8 to be conveyed to the interior of the vehicle body.

It will be apparent from the foregoing that my device possesses considerable advantages over similar devices, in view of the fact that when the shutter is closed the heated air from the chamber 7 can be utilized for heating the chamber in which the motor is located to facilitate warming up of the motor and when the shutter is opened, the air will be conducted through the heating chamber 7 to the body of the vehicle. The parts necessary for attaching my invention to an ordinary make of vehicle are comparatively simple so that the same can be attached to a vehicle with very little cost.

It will be noted that in order to draw the air through the radiator by means of the suction fan 5, I have attached to the rear of the radiator a frusto conical member 16, the smaller end of which encircles the fan, while the larger end embraces the radiator 3. This arrangement effects a direct suction from in front of the radiator whether the shutter 12 is opened or closed, and when closed the suction will be drawn from the open front side of the chamber 11.

While I have shown and described the preferred embodiment of my invention, it will be apparent that slight changes may be made in the construction when putting the invention into practice without departing from the spirit of the same or the scope of the appended claim.

I claim:

The combination with an internal combustion engine having an exhaust manifold, a hood enclosing the engine, a radiator at the front of the engine, and a fan for cooling the engine disposed intermediate the radiator and the engine, of an attachment therefor including a supplemental hood enclosing the radiator having a wide entrance opening, shutters for controlling said entrance opening, a hot air heater surounding the exhaust manifold, a hot air pipe leading from the heater to the front of the motor, and an air collecting shield disposed directly in rear of the radiator and extending to and tapering toward said fan, an enlarged air receiving and discharging chamber extending substantially the full height of the radiator, and disposed at one side thereof communicating at its forward end with the space between the radiator and supplemental hood, and means connecting the front end of the hot air pipe with the rear end of the chamber.

In testimony that I claim the foregoing I have hereunto set my hand at Milwaukee, in the county of Milwaukee and State of Wisconsin.

HERMAN C. FRENTZEL, Jr.